United States Patent
Sturgeon et al.

(10) Patent No.: US 6,429,879 B1
(45) Date of Patent: Aug. 6, 2002

(54) CUSTOMIZATION SCHEMES FOR CONTENT PRESENTATION IN A DEVICE WITH CONVERGED FUNCTIONALITY

(75) Inventors: Derrill L. Sturgeon, Houston, TX (US); Donald K. Zickefoose, Canal Fulton, OH (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/940,651

(22) Filed: Sep. 30, 1997

(51) Int. Cl.$^7$ ................................................. G09G 5/00
(52) U.S. Cl. ......................... 345/723; 386/35; 707/100
(58) Field of Search ............................... 345/354, 328, 345/352, 353, 327, 329, 355, 716, 733, 723, 741, 747; 707/100–102; 369/27; 348/552; 386/35, 70

(56) References Cited

U.S. PATENT DOCUMENTS

| | | | |
|---|---|---|---|
| 5,721,829 A | * 2/1998 | Dunn et al. | 709/219 |
| 5,825,876 A | * 10/1998 | Peterson, Jr. | 705/52 |
| 5,915,067 A | * 6/1999 | Nonomura et al. | 386/70 |
| 5,929,857 A | * 7/1999 | Dinallo et al. | 345/354 |
| 5,945,988 A | * 8/1999 | Williams et al. | 345/327 |
| 5,959,946 A | * 9/1999 | Tognazzini | 369/32 |
| 5,990,884 A | * 11/1999 | Douma et al. | 345/327 |
| 6,009,234 A | * 12/1999 | Taira et al. | 386/95 |

OTHER PUBLICATIONS

Nilsson Frank; "DVD–the storage medium for the future?"; Accessed Sep. 8, 1997; pp. 1–9.
DVD Frequently Asked Questions (with answers!); Accessed Jun. 18, 1997; http://www.videodiscovery.com/vdyweb/dvd/dvdfaq.html.
Parker, Dana J.; "DVD: The Update"; *CD–ROM Professional*, Aug., 1996; Accessed Sep. 8, 1997; pp. 1–10.
"Digital Video Disc: The Coming Revolution in Consumer Electronics"; *C–Cube Microsystems*; Accessed Jun. 23, 1997; http://www.c–cube.com/technology/dvd.html.
"Toshiba SD3006 DVD Digital Video Disc Player"; Consumer Direct Warehouse; Accessed Jun. 18, 1997; http://www.consumer–direct.com/detail.com/detail.cfm?V-PARTNO=SD3006&WEIGHT=9.0&Q=230.0.

* cited by examiner

*Primary Examiner*—Raymond J. Bayerl
*Assistant Examiner*—Tadesse Hailu
(74) *Attorney, Agent, or Firm*—Sharp Comfort & Merrett P.C.

(57) ABSTRACT

Schemes for customization of content presentation relating to a Digital Versatile/Video Disc source, which source is preferably integrated into a convergence device system. A user preferences or settings database is provided that is automatically maintained or supported by a computer subsystem, wherein records containing user preference values are indexed to a DVD title or volume having an identity tag. Changed values are also stored and applied during the next playback of the title. The present invention also provides a censor block database structure containing individualized viewing sequences from a title for different users with different levels of censorship.

27 Claims, 4 Drawing Sheets

CUSTOMIZATION SCHEMES FOR CONTENT PRESENTATION IN A DEVICE WITH CONVERGED FUNCTIONALITY

CROSS-REFERENCE TO RELATED APPLICATIONS

This application hereby incorporates by reference the following co-assigned patent application which describes related subject matter in greater detail: "DEVICE WITH CONVERGED FUNCTIONALITY", filed Mar. 31, 1997 application No. Ser. 08/828,992 (abandoned; continuation application Ser. No. 09/303,827 filed May 3, 1999); inventors: Mark P. Vaughan, Thomas J. Brase, Drew S. Johnson, Kevin J. Brusky, and Brian V. Belmont.

BACKGROUND OF THE INVENTION

1. Technical Field of the Invention

The present invention relates to content customization schemes usable in devices with integrated multiple functional modalities, which devices can operate, for example, with a host of video sources. More particularly, the present invention is drawn to schemes for individualized content censoring and for setting various user preferences to customize content presentation in a convergence device system having a Digital Versatile/Video Disc (DVD) source.

2. Description of Related Art

Achieving convergence of various information, entertainment and communications technologies has become a much sought-after goal. A highly visible example of this trend is the attempt to integrate computer technologies (such as, for example, personal computer technologies) with consumer/home electronics technologies (such as, for example, television technologies, video game technologies, video telephony, video/laser disc technologies, et cetera). It is hoped that one of the products of this convergence will be a single integrated device for information, entertainment and communications, which device can, at least in part, utilize the available communications bandwidth, mass storage and graphics handling capabilities of the personal computer (PC) to deliver, store and display a variety of applications so as to provide a seamlessly unified audio-visual environment to consumers.

In spite of many recent advances in this area, several problems persist. One of the more significant problems is the difficulty of providing to a consumer (alternatively, a user or viewer) means for effective content control and engaging interactivity, preferably all in one machine, with the option of selectable content customization. It can be readily appreciated by those skilled in the art that the need to address and obviate this problem is especially pronounced in cases wherein currently available advanced storage technologies such as, for example, the Digital Versatile/Video Disc (DVD) technology, are integrated with a highly converged device that offers multiple modes of "functionalities." In simple terms, there are so many factors involved that providing easy but effective control is difficult in highly converged devices. A commonly-owned, pending U.S. patent application entitled "DEVICE WITH CONVERGED FUNCTIONALITY", filed Mar. 31, 1997 (Docket No. 27757-00098; inventors: Mark P. Vaughan, Thomas J. Brase, Drew S. Johnson, Kevin J. Brusky, and Brian V. Belmont) describes subject matter related to such a highly converged device in greater detail and is incorporated herein by reference.

Because the teachings of the present invention are exemplified in relation to various aspects of DVD technology, particularly when integrated with a convergence device, a brief description thereof is deemed appropriate and is provided immediately hereinbelow.

The DVD technology is an advanced, digital storage technology for video, audio, data, and any combination thereof, and is centered around a new medium (a laser-readable disc) capable of storing up to about 17 Gigabytes of information. As is known in the art, the copious amount of digital information is provided on the disc in accordance with a standardized format. Analogous to current consumer electronics formats, it is useful to visualize the DVD format technology as a total system that comprises a mastering facility, a physical storage/distribution medium (the disc itself) and a player. The mastering process may typically comprise several steps which include inserting various codes for controlling the presentation of video/audio information (also known as content); compressing the raw video information into a known format (for example, the Motion Picture Experts Group-2, or, MPEG-2, format) using a process called variable bit rate encoding; compressing the audio information also into a known format such as, for example, the Dolby® AC3 Surround Sound format; and combining the compressed audio and video information into a single, encoded data stream for producing a "master" and generating copies (i.e., laser-readable discs) therefrom.

FIG. 1 depicts a block diagram of a typical DVD mastering system 100 for effectuating some of the steps described above. Inputs from a master video tape 102 and a master audio tape 104 are provided to a variable bit rate (VBR) encoder 106 and a suitable audio encoder 108, respectively. The encoders 106 and 108, in turn, are managed via content/quality control block 110 so as to provide compressed and encoded video and audio to a multiplexer/formatter 112 for generating a combined audio/video data stream. An emulator 114 is provided to simulate the playback of the data stream. A master disc 116 is then created using the "image" of the DVD data steam which may have been written to a data tape beforehand. Using replicators, a content provider may mass-produce DVD discs for market consumption by "pressing" the master 116.

The digital information on a DVD disc is organized in a well-known hierarchical file structure comprising such levels as program chains (PGCs), chapters, group of pictures (GOPs), et cetera, which allows not only a plethora of desirable features such as, for example, multiple aspect ratios, multiple language tracks and subtitles, multiple camera angles, and rudimentary forms of parental control, but also a presentation technique for allowing and facilitating user interactivity via an overlaid graphics tool, called an on-screen display (OSD) tool.

FIG. 2 depicts the block diagram of a typical DVD player 200 for the playback of a DVD disc 202. A disc reader mechanism is provided with the player 200, which mechanism comprises a motor 204 for spinning the disc 202 and a laser 206 that reads the digital information therefrom. Typically, the laser 206 is operable in the "red" portion of the visible light spectrum. A DVD-compliant digital signal processor (DSP) 208 is provided in a feedback arrangement with the disc reader mechanism for translating the laser pulses generated from the laser 206 back into electrical form.

At the heart of the player 200 is a digital audio/video (AV) decoder 210 that receives electrical signals from the DSP 208 for further processing. The AV decoder 210 comprises several important functional blocks which act on the received electrical signals at various stages of processing.

The composite signal information is initially separated by a demultiplexer 212 which provides video content stream to a video decoder 214, compressed bitmaps to a subpicture processor 216, and audio content stream to an appropriate audio decoder 218. The subpicture processor 216 provides the processed subpicture information to an OSD graphics tool 220. A video multiplexer 222 controllably presents the decoded video information from the video decoder 214 and the output from the OSD graphics tool 220 to an appropriate TV signal encoder 224 (compliant with, for example, the National Television Standards Committee (NTSC) signal format, or the Phase Alternate Line (PAL) signal format), which then provides a suitable TV signal to a TV (not shown) for playback. The decoded audio information from the audio decoder 218 may be provided to an appropriate audio system which may or may not be integrated with the TV. A microcontroller 226 is provided as part of the DVD player 200 for supervising the operation thereof. As can be readily seen, the microcontroller 226 may be engaged by the user via a remote control or front panel 228 for translating user inputs into commands for the audio/video decoder 210 and/or the disc reading mechanism of the player 200.

It can be appreciated that the DVD technology comprising the DVD discs and suitable players therefor provides significant advances over conventional media for content presentation to viewers. However, it is also known that while the DVD mastering standards have been extant for some time, the content providers who typically supply the DVD-compliant content in the form of "titles" substantially control the various available presentation settings for a particular title. It can be readily recognized that viewers who may desire to change some or all of the available settings for a particular title in order to customize the content presentation to suit their different needs and tastes may have to be provided with a mechanism for doing so in a user-friendly manner. Further, it should be apparent that the need for such mechanism is especially pronounced in a convergence device.

In addition, although DVD technology offers a wide-ranging menu of choices and options to viewers, in some instances it may be considered rather deficient. For example, current DVD players are limited in allowing users to specify their preferences which include, for example, parameters such as audio language, subtitle language, picture aspect ratios, screen saver options, OSD options, et cetera. In a typical implementation, a DVD player allows user preferences to be primarily specified only globally. Accordingly, one problem that is quite apparent is that while a user may prefer one set of preferences for most discs, he may prefer a different set of preferences for a particular disc or title. For instance, a user may prefer the "pan and scan" video presentation style in general, but in the case of a particular movie which features, as an example, panoramic battle scenes, "letter box" aspect may be preferred. It can be seen that by using existing DVD players, the user would have to override his global preference setting or settings (also referred to as value or values) each time that particular disc is played back.

Another problem that has been known for some time is that in current DVD players it is extraordinarily difficult for users to interrupt the playback of a disc or title, watch another disc and return to the place where the first disc was interrupted and resume the viewing thereof. Similarly, it is quite difficult in existing DVD implementations to find and tag a favorite scene in a program for future reference such that a subsequent playback of the title could resume therefrom, unless that scene happens to be located at the beginning of a chapter.

Yet another, perhaps more vexatious, deficiency in current DVD technology relates to parental management of content presentation. It is known that the DVD specification provides a definition for a parameter called "Playback with Parental Management" and multiple parental levels (for example, Kid Safe, Theatrical, Adult, et cetera) are typically defined. Further, parental management is typically accomplished by comparing the user-configurable player parental identity value to the value provided in the parental ID field which may typically be present in each program chain contained in a title. It can be readily appreciated that problems arise when a content provider either does not provide a value in the parental ID fields at all, or when the user is dissatisfied with the available parental levels and would like to customize the presentation of the content in accordance with his particular subjective decisions.

Therefore, based on the foregoing, it should be understood by those skilled in the art that there is a need for a simple yet effective solution that addresses these shortcomings in current implementations of DVD technology. Although several DVD systems presently exist, no current system is known to have all of the advantages and novel features of the present invention, described and claimed hereinbelow, which advantageously provides systems and methods for overcoming the above-mentioned deficiencies.

SUMMARY OF THE INVENTION

In one aspect, the present invention is drawn to system of the type including a display monitor, comprising: a video source for providing a program sequence to be viewable on the display monitor, wherein the program sequence is characterized by at least one parameter for affecting the presentation thereof and is identifiable by an identity tag; a computer subsystem for managing the presentation of the program sequence on the display monitor, the computer subsystem comprising a storage unit and a processing unit; and a database structure supported by the computer subsystem, wherein the database structure comprises a record associated with the identity tag, the record including at least one user-specified value for customizing the presentation of the program sequence. In a preferred embodiment, the user-specified value comprises at least one of a preference setting, an auto-resume bookmark or a specific-position bookmark.

In another aspect, the present invention relates to a method of customizing the presentation of a program sequence in a device system having a persistent storage unit, wherein the program sequence is characterized by at least one parameter affecting the presentation thereof, comprising the steps of: identifying the program sequence with an identity tag; and creating a record in the persistent storage unit, the record comprising a preselected value, wherein the record is associated with the identity tag.

In yet another aspect, the present invention is also directed to a method of censoring a program sequence provided by a DVD source, comprising the steps of: marking a first location in the program sequence responsive to a first input by a user, wherein the first location is positioned relative to a start time associated with the program sequence; incrementing a program time associated with the program sequence; marking a second location in the program sequence responsive to a second input by the user; and storing time values associated with the first location and the second location in a record supported by a storage medium, wherein the record is indexed to the user.

BRIEF DESCRIPTION OF THE DRAWINGS

A more complete understanding of the present invention may be had by reference to the following Detailed Description when taken in conjunction with the accompanying Drawings wherein.

DETAILED DESCRIPTION OF THE DRAWINGS

Figure 1:
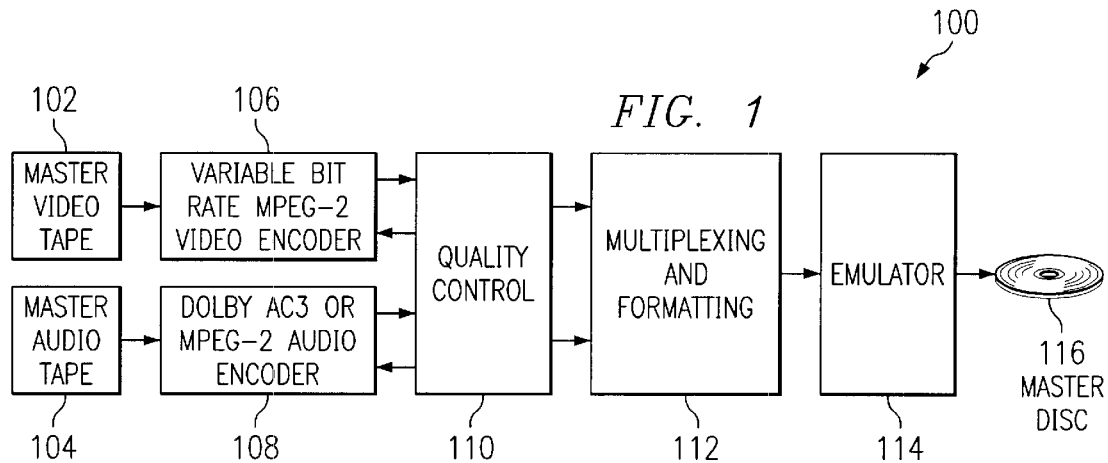
FIG. 1 illustrates a conventional DVD mastering system.
Figure 2:
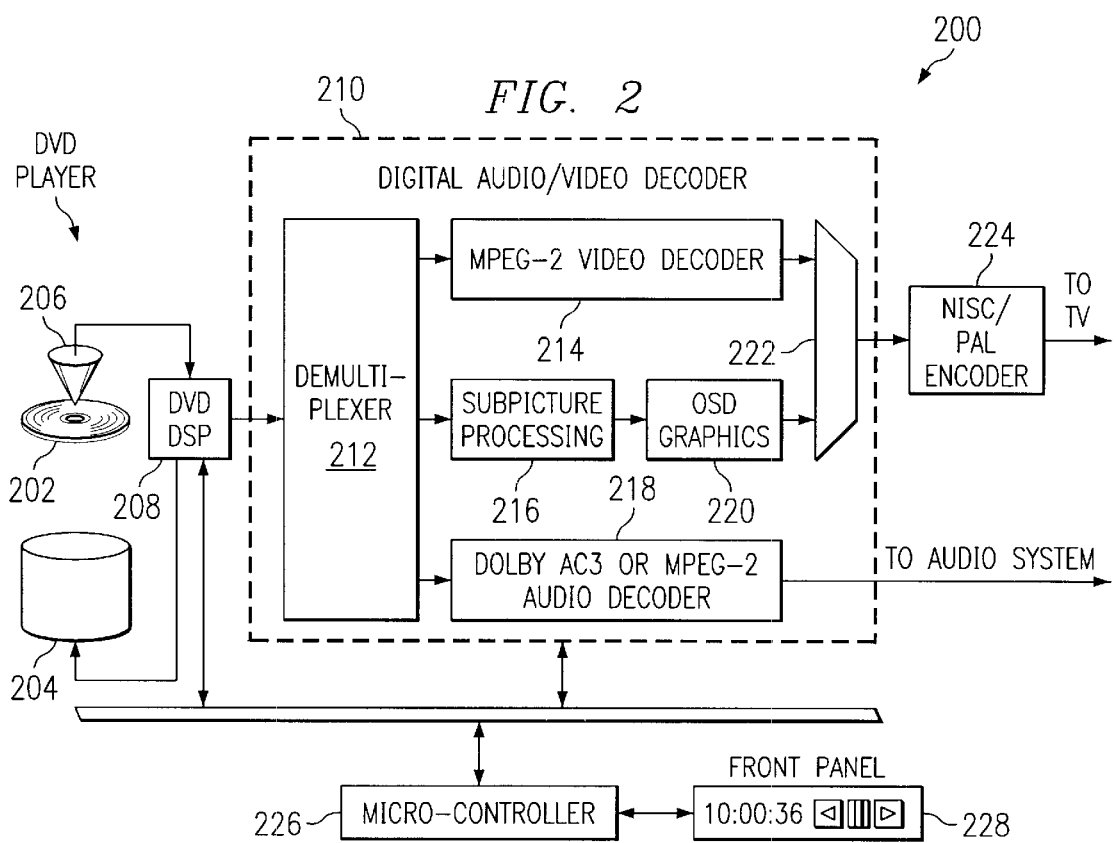
FIG. 2 depicts a block diagram of a conventional DVD player adapted for playing a DVD title.
Figure 3:
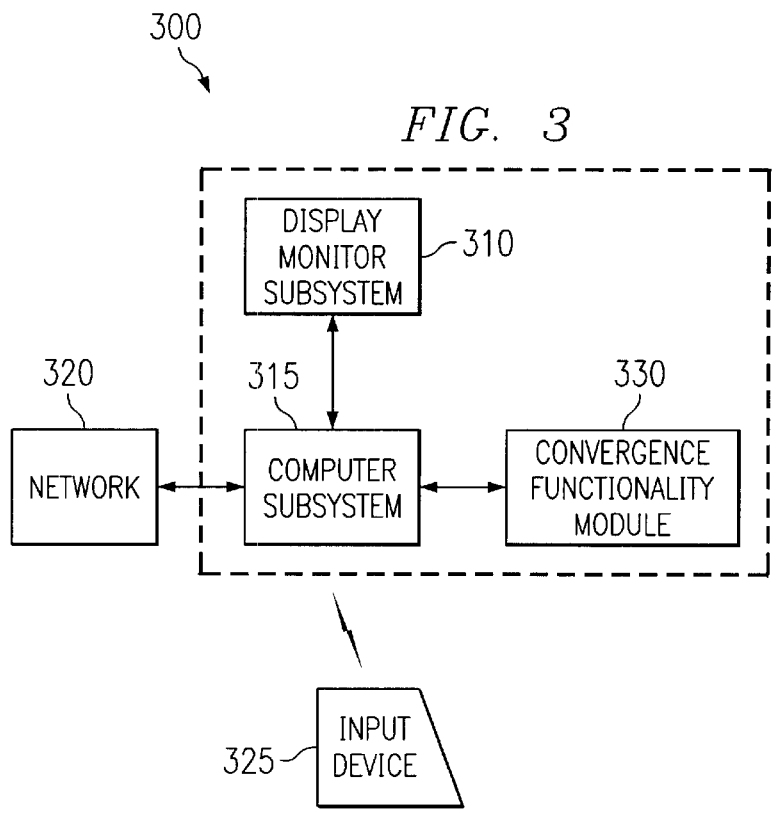
FIG. 3 depicts the block diagram of an exemplary convergence device system including a DVD source, wherein the teachings of the present invention may be utilized.

Referring now to the Drawings wherein like or similar elements are designated with identical reference numerals throughout the several views, and wherein the various elements depicted are not necessarily drawn to scale, and, in particular, to FIG. 3, there is shown a block diagram of an exemplary convergence device system (or, an electronic convergence device) 300 provided wherein the teachings of the present invention may be advantageously practiced. It should be appreciated by those skilled in the art that this block diagram is not necessarily intended to schematically represent specific modules of hardware or any particular data or control paths therebetween.

The convergence device system 300 includes a first subsystem, display monitor subsystem 310, operable to receive and display thereon display signals (or, indications thereof) received from a second subsystem, computer subsystem 315. Although not depicted, the subsystem 315 comprises a processor unit coupled to a storage unit, and may further preferably contain a communication port for enabling communication between the convergence device system 300 and a network 320.

Continuing to refer to FIG. 3, the network 320 can be understood to be any network, for example, a Local Area Network, a Metropolitan Area Network, a Wide Area Network, or the Internet. The computer subsystem 315 is connected to at least one convergence functionality module 330 that is adapted to receive and/or provide various combinations of composite and/or RF and/or video and/or audio and/or graphics and/or data signals. For example, the module 330 may comprise a receiver for receiving TV signals in any form, such as the NTSC form or the PAL form, via any medium, digital or analog, such as a cable system, a Digital Satellite System, or a network broadcast medium. In another embodiment, the module 330 may comprise a consumer/ home electronics unit adapted to be integrated with the computer subsystem 315 in addition to a TV receiver. For example, a video gaming unit or a DVD unit may be provided such that the outputs (video, audio, or both) of the units are controlled or modulated by the computer subsystem 315. A video controller service in the subsystem 315 may be responsible for managing these outputs such that appropriately modulated (or decoded or processed) display signals (or, indications thereof) are selected to be forwarded to drive suitable output devices, for example, the display monitor subsystem 310 or an audio output device (not shown).

Although the module 330 and the subsystem 315 are shown to be two separate yet interconnected entities, the module 330 may in some embodiments of the present invention be integrated into the subsystem 315. Such an integrated subsystem may comprise in a single housing one or more video sources (or consumer/home electronics units including receivers for TV signals, gaming units, VCRs, video/laser disc units, video telephony units etc.), the video control service for managing and selecting among these sources and for generating appropriate display signals (or, indications thereof) to be provided to suitable output devices, and the processor and storage units.

Still continuing to refer to FIG. 3, the convergence device system 300 may be operable with an input device 325 which may comprise any of the following: remote control units, remote track-ball/mouse devices, remote pointing devices, wireless or wired keyboards, keyboards integrated with pointing devices, track-balls and the like. Further, although not shown in this FIG., it should also be understood that the convergence device system 300 may contain such hardware modules as one or more power units for supplying power thereto, TV tuner boards, CD-ROM players, floppy drives, printer ports, video ports, et cetera.

Figure 4:
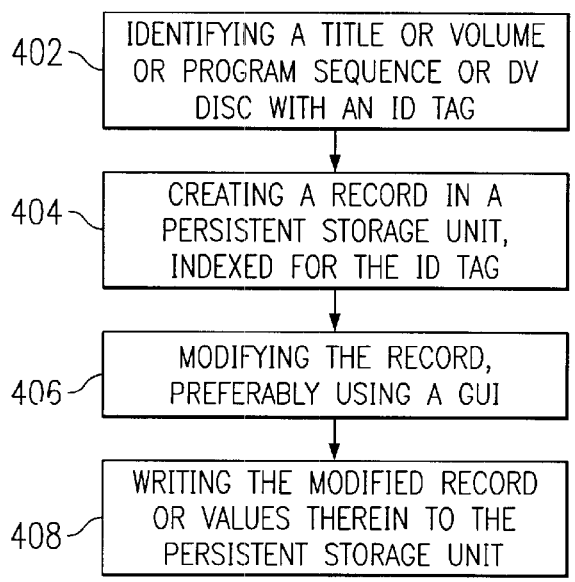
FIG. 4 depicts a flow diagram relating to an exemplary embodiment of a method for customizing content presentation in accordance with teachings of the present invention.

Referring now to FIG. 4, there is shown a flow diagram of a presently preferred exemplary embodiment of a scheme provided in accordance with the teachings of the present invention for customizing the presentation of DVD-compliant content. As has been described in the Background, current DVD implementations do not allow for content customization by users by way of setting modifiable preferences relating to one or more parameters. As is known in the art, these parameters, which affect the presentation or playback of the DVD title, may comprise such things as audio language, subtitle language, picture aspect (e.g., 4×3, or letterbox, or pan and scan), screen saver options, OSD options, et cetera. In accordance with the teachings of the present invention, a persistent storage unit associated with a processing unit, for example, the computer subsystem 315 shown in FIG. 3, may be used to create a database structure for storing user-modifiable preference settings for each DVD disc or volume (or, title or program sequence) such that the next time when the disc is inserted into a DVD player, the user preferences would preferably automatically be applied so as to modulate the presentation of the DVD-compliant content. It should be appreciated that the DVD player may preferably be integrated into a convergence device system, for example, the system 300, as described above in reference to FIG. 3.

As provided in step 402, a DVD title or volume or program sequence is preferably identified with an identity (ID) tag. It should be appreciated that the ID tag may also be a computationally generated value based, at least in part, on the content itself. One or more records may be created, which may preferably be indexed to the ID tag (step 404), such that the entries in the record or records correspond to the user selected values for one or more parameters affecting the content presentation. A graphical user interface (GUI) may be provided for facilitating user interactivity whereby one or more user preferences may be selectively changed at any point during the playback of a volume or program sequence (step 406). These modifications are preferably written back to the record relating to the volume ID tag in the persistent storage unit, as provided in step 406.

Figure 5:
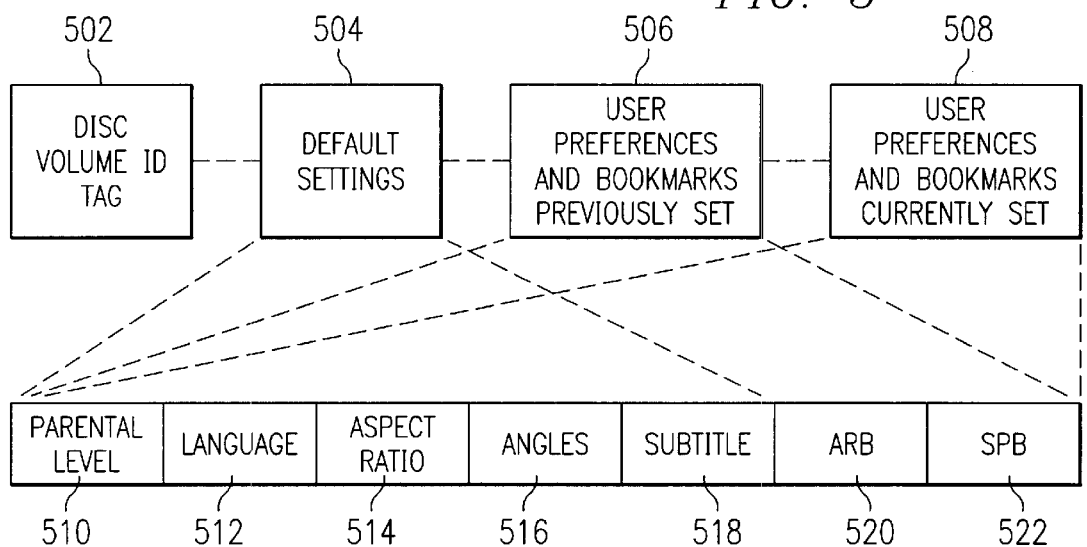
FIG. 5 depicts an exemplary database structure provided in accordance with the teachings of the present invention for customizing content presentation.

FIG. 5 depicts an exemplary embodiment of a record in a database structure provided in accordance with the teachings contained herein. Those of ordinary skill in the art should realize that the exemplary database structure may be implemented in any known fashion and may contain one or more records. Further, multiple records may be indexed to the same disc volume ID tag 502. In this exemplary embodiment, a default settings portion 504 may also preferably be provided so that a user can force the DVD player system, for example, the convergence device system 300, back to his global preferences (that is, those settings applicable to all DVD volumes) by selecting an appropriate option in the GUI. As can be seen in this FIG., the default settings portion 504 may comprise, for example, a parental level portion 510, language portion 512, aspect ratio portion 514, angles portion 516, and a subtitle language portion 518, in addition to various other parameters heretofore known and unknown and not depicted herein. Further, along with various preference values, a user can also set positional entries in the exemplary database structure. It should be appreciated that these positional entries may be referred to as bookmarks and they serve essentially the same function for a DVD disc as a conventional bookmark does for a book. A DVD bookmark, in accordance with the teachings of the present invention, may preferably contain the information needed to resume viewing at a previously marked position on a particular disc or volume.

For example, the exemplary record indexed for the disc volume ID 502 may also comprise a previously set user preferences portion 506 and a currently set user preferences portion 508, each of which may comprise an "auto-resume bookmark" (ARB) 520 and a "specific-position bookmark" (SPB) 522 in accordance with the teachings of the present invention. The ARB 520 relates to a positional entry, which may preferably be automatically set, for the current position in a disc volume prior to ejecting or stopping the playback when a stop or eject command is issued by the user while viewing a DVD volume or program sequence. Accordingly, the ARB 520 may preferably exist only for previously viewed disc volumes. It can be appreciated that the problem of being able to resume viewing a disc or volume where a user left off, is effectively solved by utilizing an ARB in accordance with the teachings of the present invention. After setting an appropriate ARB in a disc volume, the user could simply select a "resume play" option from the GUI after inserting the disc into the system.

Continuing to refer to FIG. 5, it should be understood that although only a single SPB 522 is illustrated herein, there may be several bookmarks in a disc volume for marking a plurality of particular scenes (or, favorite scenes) contained therein. These scenes need not be limited to those found at the chapter boundaries in the program sequence of the disc volume. The SPB 522, accordingly, is preferably selected by a user by issuing a "set bookmark" option in the GUI. Further, optionally, the user may also enter a descriptive comment for a selected SPB. Subsequently, when playing back a disc with bookmarks, the user can browse the SPBs within the GUI which have been previously set. When a particular SPB is selected, viewing resumes at that position (relative to its chapter, time in chapter, including parameters such as angles, et cetera) indicated thereby.

Figure 6A:
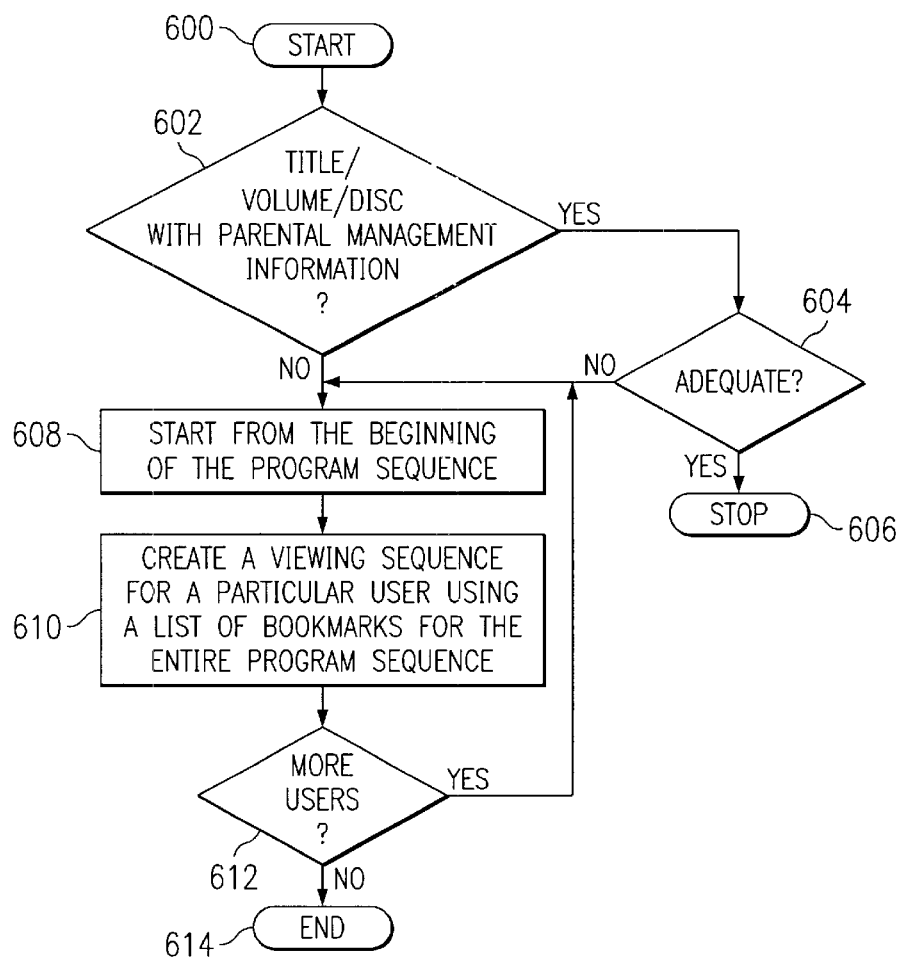
FIGS. 6A and 6B depict a flow diagram for an exemplary embodiment of a scheme for censoring content in a program sequence or title.
Figure 6B:
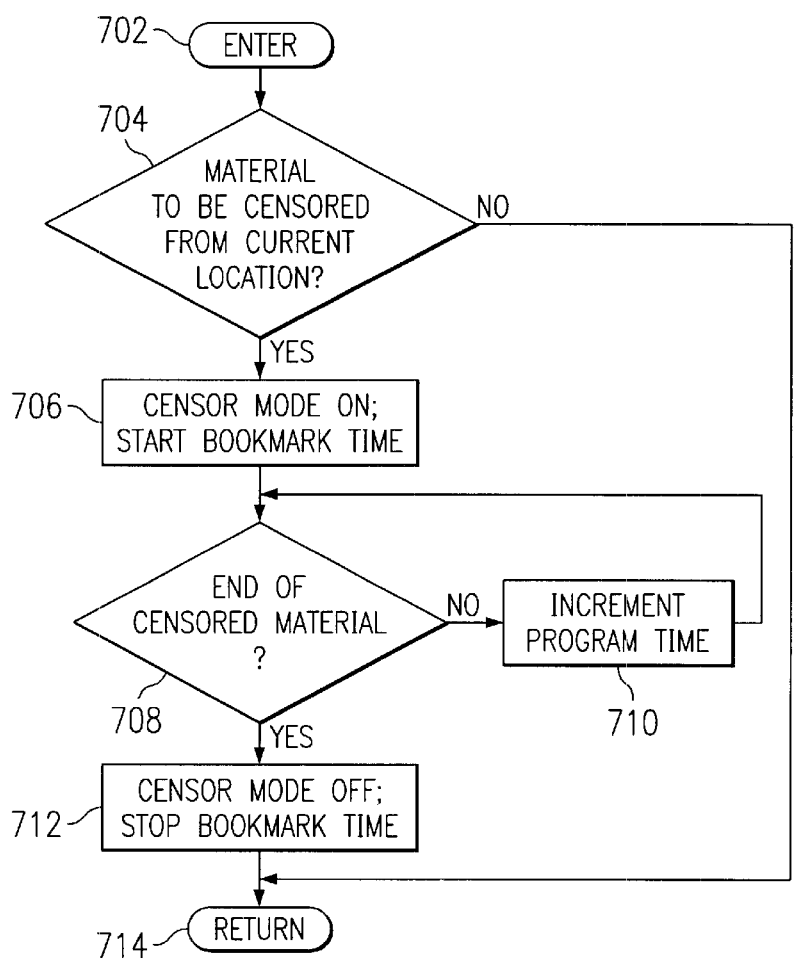

FIGS. 6A and 6B depict a flow diagram for an exemplary embodiment of a method of content censoring by providing for multiple viewing sequences within a program sequence or title in accordance with the teachings of the present invention. It should be understood that the exemplary scheme described herein may preferably be implemented on a converged platform such as the convergence device system 300 shown in FIG. 3.

After determining that a title or volume contains inadequate parental management information or none at all (decision blocks 602 and 604), a dominant user (typically a parent with initial access privileges) who is desirous of censoring some of the content in accordance with his needs, starts from the beginning of the program sequence (which may contain one or more program chains or PGCs) (step 608). By interacting with the convergence device system 300, preferably through a combination of alternative mechanisms including remote control, pointing device, remote keyboard and GUI, the user may specify which sections of a title are to be restricted from unauthorized access for one or more subordinate users (for example, children). As provided in step 610, using a list of time-based bookmarks that are referenced or indexed from the start time of the program sequence, a separate viewing sequence for each subordinate user is then created.

FIG. 6B provides an amplified flow diagram for this particular step 610 in greater detail. Once material to be censored is encountered (decision block 704), a censor mode is turned on, preferably by using an interactive OSD (IOSD). It may be appreciated that other user input mechanisms such as, for example, pressing a key on the remote control or keyboard may also be employed. A censor start-time is bookmarked responsive to the censor mode that has been turned on (step 706). When the dominant user determines that the end of the material to be censored has been reached (decision block 708 and step 710), the censor mode is turned off and a censor stop-time is accordingly bookmarked as provided in step 712. It should be appreciated that although only one censor block is illustrated herein, multiple censor blocks can be created for a user by traversing the entire program sequence and appropriately turning on and off the censor mode and creating censor start-time and stop-time bookmarks. After creating and appropriately storing the necessary censor bookmarks for the user, the flow control subsequently returns (step 714) to decision block 612 in FIG. 6A to repeat the censoring process for additional users. In a presently preferred exemplary embodiment, the censored areas are accordingly recorded as start- and stop-time values relative to the start time of a specific title and preferably apply to all angles for the censored time periods within the title. By using the GUI, the user may optionally review and edit the list of censored title sections.

Figure 7:
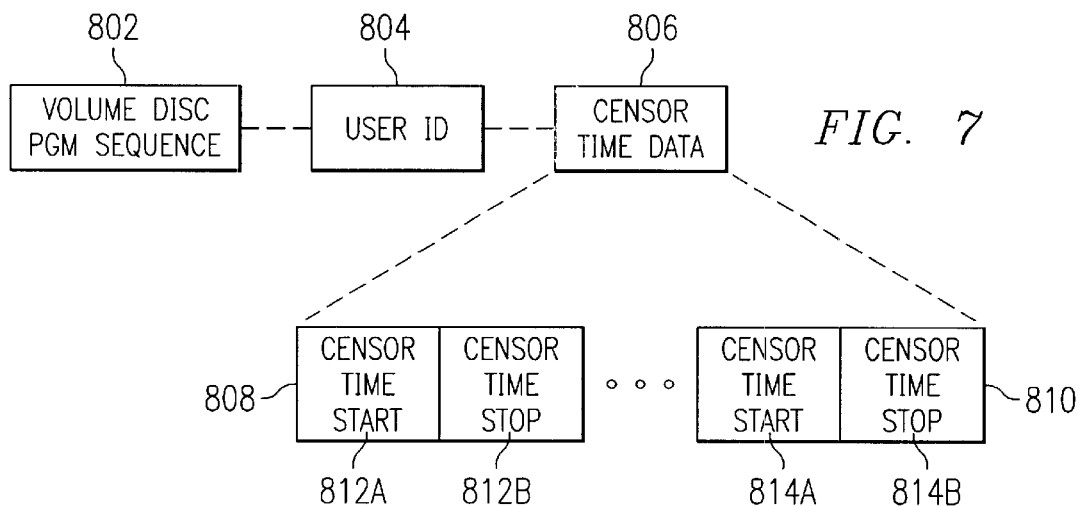
FIG. 7 illustrates an exemplary database structure relating to censor time data for creating multiple viewing sequences in a program sequence in accordance with the teachings of the present invention.

Referring now to FIG. 7, there is shown an exemplary data structure, preferably supported by the computer subsystem 315 of the convergence device system 300, for storing a censor time data record 806 that is indexed to a user ID 804 for a particular disc volume (title or program sequence) 802. Depending on the number of users, including dominant users, multiple user IDs may be created for the disc volume 802, each ID being indexed to a specific censor time data record 806. As can be seen, the censor time data record 806 preferably comprises one or more censor blocks, for example, censor blocks 808 and 810, each including a censor start-time and censor stop-time values.

The censored playback of the disc volume 802 is accomplished by monitoring the time in the title and comparing it to the censored list or censor time data record 806. When the start of a censored block is reached, the system skips ahead to the end of the block and resumes play. It should be appreciated that a privileged user can disable censored playback for a particular disc for a single viewing session or permanently via the GUI. An access control scheme, for example, a personal identification number (PIN) scheme, may be used for controlling privileged access for such capability. Furthermore, a user may optionally insert less offensive or more agreeable content for the duration of a censor block provided from other sources.

Based on the foregoing, it should be realized that the present invention advantageously provides a preferences or settings database structure that is preferably stored in a persistent storage unit, which structure is preferably automatically maintained such that records contained therein relating to user preference values are indexed to a particular disc volume. Each time a user chooses to change or override a previously set preference value, that change or override is recorded in the database structure and indexed to the current disc volume ID tag. Accordingly, the next time that disc volume is inserted, the new value or values will be preferably automatically applied. Also, positional entries are provided in accordance with the teachings of the present invention to facilitate automatic resume of a disc where it was left off and to select playback from a specific or favorite location in the program sequence or title.

It should further be appreciated that the present invention also provides a censor time database structure comprising various viewing sequences for different users (including adults) in order to facilitate more individualized parental management of content presentation. The viewing sequences are preferably based on timed bookmarks for tagging objectionable material, which bookmarks may be located at any place in the program sequence. Thus, it is not necessary that a censor block or segment be co-terminus with the end or beginning of a PGC.

Although only certain embodiments of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims. For example, notwithstanding the inclusion of the Detailed Description of a convergence device system, it should be understood that the teachings of the present invention may also be practiced in a computer system with a suitable adapter or expansion card. Further, persistent storage used for supporting the database structures in accordance herewith may include any magnetic, optical, opto-electronic, electronic or non-volatile memory components. It may be appreciated that the preferences data and censor time data may be organized in a variety of records and data types. The censor start- and stop-time bookmarks may be offset from a start time associated with a program sequence or relative to each other. Accordingly, it should be realized that all these and other variations are contemplated to be within the ambit of the present invention, the scope of which is limited solely by the following claims.

What is claimed is:

1. A system of the type including a display monitor, comprising:

a video playback source for providing playback from a recorded medium of a recorded video program sequence to be viewable on said display monitor, wherein said program sequence is characterized by at least one user specified parameter for affecting the playback presentation thereof;

a computer subsystem for managing the playback presentation of said program sequence on said display monitor, said computer subsystem comprising a persistent storage unit and a processing unit; and said persistent storage unit incorporating a database structure for use by said computer subsystem to manage playback of said program sequence, wherein said database structure comprises a stored record including an identity tag identifying said program sequence and a value or values representing the or each user specified parameter in said program sequence such that each playback of that program sequence is customized in response to the or each said stored user specified value; and wherein said data structure also includes in said stored record at least one user-specified value operable to enable an auto-resume bookmark to mark the location in said program sequence where the playback thereof is interrupted such that the playback can be resumed at a later time from said auto-resume bookmark.

2. The system as recited in claim 1, wherein said recorded medium comprises a Digital Versatile/Video (DV) Disc.

3. The system as recited in claim 2, wherein said parameters include at least one of: audio language, subtitle language, picture aspect ratio.

4. A system of the type including a display monitor, comprising:

a video playback source for providing playback from a recorded medium of a recorded video program sequence to be viewable on said display monitor, wherein said program sequence is characterized by at least one user specified parameter for affecting the playback presentation thereof;

a computer subsystem for managing the playback presentation of said program sequence on said display monitor, said computer subsystem comprising a persistent storage unit and a processing unit; and said persistent storage unit incorporating a database structure for use by said computer subsystem to manage playback of said program sequence, wherein said database structure comprises a stored record including an identity tag identifying said program sequence and a value or values representing the or each user specified parameter in said program sequence such that each playback of that program sequence is customized in response to the or each said stored user specified value; and wherein the data structure includes in said stored record, one or more user-specified specific-position bookmark values for marking one or more predetermined locations in said at least one program sequence such that the playback thereof can be user-selected to resume automatically from the or each specific-position bookmark.

5. A method of customizing the playback presentation of a recorded video program sequence from a storage disc, by a user operable computer system having a persistent storage unit, wherein said program sequence is characterized by at least one parameter affecting the presentation thereof, comprising the steps of:

creating and maintaining a database record stored in said persistent storage unit, said stored database record including an identity tag identifying said program sequence and user-modifiable values indexed to said tag, said user modifiable values representing different value settings of each of a plurality of said parameter affecting presentation of the program sequence associated with said identity tag, and by user input to the computer system selecting and storing in said database record in the persistent storage unit, a value setting of at least one of said parameters to customize management by the computer system of subsequent playback presentation of said program sequence.

6. The method as recited in claim 5, wherein said at least one presentation affecting parameter includes one or more of audio language, subtitle language, picture aspect ratio.

7. The method as recited in claim 5, further comprising the steps of:
during a said playback presentation, by user input to the computer system changing one or more of said user-modifiable value settings in said database record responsive to a user input to update said database record;
storing said updated database record in said persistent storage unit; and
applying said updated stored database record to control subsequent playback management of said program sequence by said computer system.

8. The method as recited in claim 5, further including the step of creating a value in said stored record that is operable to enable an auto-resume location bookmark to mark the position in said program sequence where the playback thereof is interrupted such that a subsequent playback is resumed from said auto-resume location bookmark.

9. The method as recited in claim 5, further including effecting user input to the computer system to enter a in said database record stored in said persistent storage unit, a value setting associated with a predetermined position in said program sequence such that the playback can be resumed at a later time from said predetermined position.

10. A method of censoring a program sequence recorded on a video storage medium, during playback by a user operable playback system including persistent memory different from said video storage medium, comprising the steps of:
storing in said persistent memory unit a database record including identification of said program sequence;
marking a first user selectable location in said program sequence responsive to a first input to said playback system by a first access privileged user, wherein said first location is positioned relative to a start time associated with said program sequence and storing in said persistent memory unit a time value associated with said first location;
incrementing a user selectable program time associated with said program sequence corresponding to a second location in said program sequence;
marking said second location in said program sequence responsive to a second input to said playback system by said first access privileged user and storing in said persistent memory unit a time value associated with said second location; and
user indexing said database record of said program sequence such that during playback of said program sequence initiated by a user different than said privileged access user, content of said program sequence between said time values associated with said first and second locations is not displayed.

11. The method as recited in claim 10, wherein said second location is positioned relative to said start time associated with said program sequence.

12. The method as recited in claim 10, wherein said second location is positioned relative to said first location.

13. A system for playback of video program sequences recorded on discs, said program sequences characterized by parameters for affecting the playback presentation thereof, comprising:

a computer subsystem for managing the playback of said program sequences, said computer subsystem comprising a persistent storage unit and a processing unit; and
said persistent storage unit incorporating a database structure for use by said computer subsystem in managing program sequence playback, wherein said database structure comprises, for each program sequence, a stored record including:
(a) an identity tag indexed to said program sequence;
(b) at least one user-specified, user-modifiable stored value relating to at least one of said parameters for customizing management by said computer subsystem of each playback presentation of said program sequence;
(c) a user-specified value to enable an auto-resume bookmark to mark the location in said program sequence where the playback thereof is interrupted such that the playback can be resumed at a later time from said auto-resume bookmark; and
(d) at least one user-specified and user-modifiable value to enable a specific-position bookmark for marking a user selectable location in said program sequence such each subsequent playback thereof can be user-selected to resume from said at least one specific-position bookmark.

14. The system as recited in claim 13, including for at least one user identified program sequence, a stored record in said database structure which includes:
user-specified and user modifiable censor bookmarks to mark in said user identified program sequence, a first location and a second location, subsequent in said program sequence to said first location, said censor bookmarks indexed to a different user, said censor bookmarks operable during playback of said user identified program sequence identified with said different user, to prevent playback of content of said user identified program sequence between said first and second locations designated by said censor bookmarks.

15. The system as recited in claim 13, wherein said user modifiable parameters include at least one of: audio language, subtitle language, picture aspect ratio.

16. The system as recited in claim 13, further including a display unit for playback display of a said video sequence recorded on a said disc.

17. The system as recited in claim 16, further including a graphical user interface operable by a user input device to effect selection and/or modification of said user-specified and/or user-modifiable values in said stored record during playback of the program sequence associated with that stored record.

18. The system as recited in claim 13, wherein said disc is a DVD.

19. A system for playback of video program sequences recorded on discs, comprising:
a computer subsystem for managing the playback of said program sequences according to user specified parameters affecting the playback presentation, said computer subsystem comprising a persistent storage unit and a processing unit;
a database structure created and maintained in said computer subsystem persistent storage unit, wherein said database structure comprises, for each program sequence a record including an individual identity tag of that program sequence and user modifiable values indexed to said tag corresponding to different value settings of each of a plurality of said playback parameters affecting presentation of the program sequence associated with said identity tag;

at least one user input device operable to select and change said value settings of said stored user-modifiable playback parameters maintained in said persistent storage unit to change playback management of that program sequence by said computer subsystem; and wherein operation of said user operable device during playback of a program sequence to modify one or more of the user-modifiable specified parameters, changes the stored value setting for the or each modified parameter stored in the persistent storage unit to create an updated record stored in said persistent storage unit indexed to that program sequence which is applied for subsequent playback management of that program sequence by said computer subsystem customized according to the updated record of value settings of user specified playback parameters.

20. The system as recited in claim 19, wherein said database structure includes, for at least one of said program sequences, a user-specified value to enable an auto-resume bookmark to mark the location in that program sequence where the playback thereof is interrupted such that the playback can be resumed at a later time from said auto-resume bookmark; and wherein said database structure also includes for at least one of said program sequences, at least one user-specified and user-modifiable value to enable a specific-position bookmark for marking a user selectable location in that program sequence such that the playback thereof can be user-selected to resume from said at least one specific-position bookmark.

21. The system as recited in claim 20, wherein said user specified parameters include at least one of: audio language, subtitle language, picture aspect ratio.

22. The system as recited in claim 19, wherein said stored record further includes:

user-specified and user modifiable censor bookmarks to mark in said program sequence, a first location and a second location, subsequent in said program sequence to said first location, said censor bookmarks indexed to a different user, said censor bookmarks operable during playback of said program sequence identified with said different user, to prevent playback of content of said program sequence between said first and second locations designated by said censor bookmarks.

23. The system as recited in claim 19, further including a graphical user interface operable by a user input device to effect selection and/or modification of said user-specified and/or user-modifiable values in a said stored record.

24. A system for playback of video program sequences recorded on discs, comprising:

a computer subsystem for managing the playback of said program sequences according to parameters including at least one user specified parameter affecting the playback presentation, said computer subsystem comprising a persistent storage unit and a processing unit;

said persistent storage unit incorporating a database structure comprising for each program sequence, a record including an individual identity tag indexed to that program sequence and a stored value or values each corresponding to a user specified playback parameter whereby playback of that program sequence is managed by said computer subsystem according to the or each stored record value;

at least one user operable device to change one or more of said user specified playback parameters and to update an associated stored record value to correspond to a changed user specified parameter such that the or each changed user specified parameter is effective during playback of that program sequence;

said persistent storage unit database structure also including for at least one user selected program sequence, a user-specified value to enable an auto-resume bookmark to mark the location in that program sequence where the playback thereof is interrupted such that the playback can be resumed at a later time from said auto-resume bookmark; and said persistent storage unit database structure further including for at least one user identified program sequence, user-specified and user modifiable censor bookmarks specified and modifiable by a first user having privileged access, to mark in said user identified program sequence, a first location and a second location, subsequent in said user identified program sequence to said first location, said censor bookmarks indexed to a user not having said privileged access, said censor bookmarks operable during playback of said program sequence identified with a said not having said privileged access, to prevent playback by a user not having said privileged access, of content of said identified program sequence between said first and second locations designated by said censor bookmarks.

25. The system as recited in claim 24, wherein said user specified parameters include at least one of: audio language, subtitle language, picture aspect ratio.

26. The system as recited in claim 24, further including a graphical user interface operable by a user input device to effect selection and/or modification during playback of a program sequence, of said user-specified values in said stored record associated with that program sequence thereby creating a new stored record operable during playback of that program sequence.

27. A method of automatically customizing playback of program sequences stored on video storage discs by a playback system including a processor and a persistent storage device to which control data can be entered and stored by user controlled input, comprising:

for one or more of said video program sequences including user specified playback presentation parameters, creating in said persistent storage device an individual record including a video program sequence identity tag and value settings corresponding to the or each user-specified playback presentation parameter associated with that particular video program sequence to enable playback presentation of said program sequence by said playback system according to selected value settings stored in the persistent storage unit of the or each said presentation parameter;

during playback of the video program sequence identified by a said identity tag, effecting a user controlled input to the persistent storage unit to change one or more value settings in the stored record associated with that identity tag, corresponding to one or more corresponding user specified playback parameters of that program sequence to change playback presentation of that program sequence change during the current and subsequent playbacks in accordance with the or each changed value setting.

* * * * *